UNITED STATES PATENT OFFICE.

FRITZ ACH, OF MANNHEIM, GERMANY, ASSIGNOR TO C. F. BOEHRINGER & SOEHNE, OF WALDHOF, GERMANY.

PROCESS OF MAKING ISO-EUGENOL AND DERIVATIVES THEREOF.

SPECIFICATION forming part of Letters Patent No. 631,756, dated August 22, 1899.

Aplication filed June 14, 1897. Serial No. 640,756. (Specimens.)

*To all whom it may concern:*

Be it known that I, FRITZ ACH, a citizen of the Empire of Germany, residing at Mannheim, in the Empire of Germany, have invented certain new and useful Improvements in Preparing Iso-Eugenol and its Derivatives; and I do hereby declare the following to be a full, clear, and exact description of the invention, such as will enable others skilled in the art to which it appertains to make and use the same.

The present invention has reference to the preparation of iso-eugenol and its derivatives, which have been extensively employed in the manufacture of vanillin.

Under all the methods hitherto employed it has not been possible, so far as I am aware, to readily convert the eugenol into iso-eugenol. This is due mainly to the fact that the concentrated alkali-lyes and high temperatures which have been employed to effect the atomic transposition in the eugenol molecule, as set forth in German Patents Nos. 57,808 and 76,982, give rise to a partial formation of polymerization and oxidation of the eugenol and consequent formation of resin. An iso-eugenol is thus obtained which cannot be directly used in the preparation of vanillin. It becomes necessary under these circumstances to first protect the free phenol group still existing by the introduction of acid or alcohol radicals. The iso-eugenol derivatives which have hitherto been obtained in this manner are all insoluble in water and are hence not susceptible of a ready and direct oxidation to vanillin derivatives.

It is the object of this invention to overcome the difficulties thus pointed out in the transition from eugenol to iso-eugenol or its derivatives. This object has been accomplished by my invention, which is based upon a discovery which I have made in the course of my investigations in this field. I have found that the preparation of iso-eugenol from eugenol may be carried out quantitatively and an iso-eugenol derivative conspicuously adapted for the manufacture of vanillin may be obtained if we take phosphoric acid derivatives of eugenol as starting materials. It is to be observed, however, that the neutral or normal eugenol and iso-eugenol esters of phosphoric acid, (phosphoric acid tri-eugenol ester and phosphoric acid tri-iso-eugenol ester,) which are insoluble in water and which have been made known in *Berichte der Deutschen Chemischen Gesellschaft*, Vol. 27, page 2456, are not adapted for this purpose; but it is necessary to take the acid phosphoric acid ester of eugenol as a starting-point.

The chlorid of the hitherto-unknown eugenol-phosphoric acid is readily obtained by causing phosphorus-oxy-chlorid to react upon eugenol according to the equation:

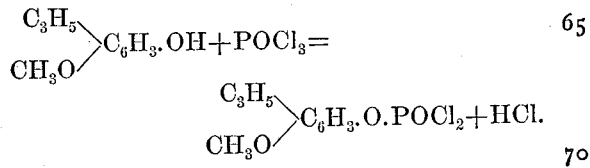

On treating the chlorid with water it is readily decomposed into hydrochloric acid and the new acid or acid ester mono-eugenol-phosphoric acid:

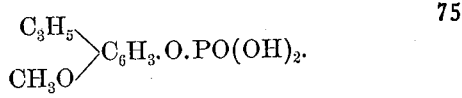

By now heating this eugenol-phosphoric acid with a dilute aqueous solution of alkali an atomic transposition takes place only in the lateral group $-C_3H_5-$ *i. e.*, the allyl group. This allyl group, whose arrangement is as follows: $-CH_2.CH=CH_2$ is transposed so as to form the propenyl group $-CH=CH.CH_3$ and hence mono-iso-eugenol-phosphoric acid is formed, the transposition being symbolically represented thus:

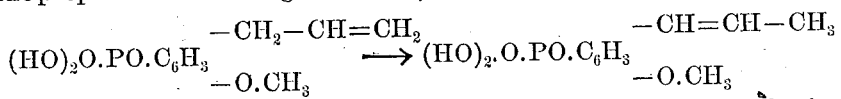

If, on the other hand, the eugenol-phosphoric acid is heated with alcoholic alkali solution, the change does not stop here; but after the iso-eugenol-phosphoric acid has been formed a concurrent saponification which takes place causes the iso-eugenol-phosphoric acid formed as an intermediate product to be split up into phosphoric acid and iso-eugenol. Iso-eugenol is hence obtained as the sole final product.

It is not necessary to employ alcoholic alkali solutions to effect the saponification of iso-eugenol-phosphoric acid into phosphoric acid and eugenol, for I have found that if we heat the alkali-salts of iso-eugenol-phosphoric acid to temperatures above 150° centigrade these salts are decomposed readily into iso-eugenol and the alkali-salts of metaphosphoric acid according to the equation:

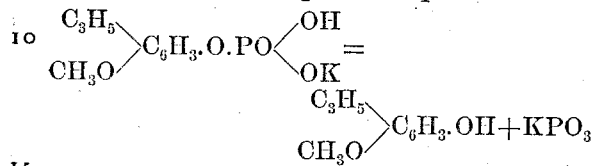

To enable those skilled in the art to which this invention pertains to practice the same, I will now proceed to describe the same in detail by setting forth examples of the preferred manner in which I carry the same into effect. The proportions are all given by weight except where otherwise stated.

(1.) *Preparation of mono-eugenol-phosphoric acid.*—One part of eugenol is mixed with two parts phosphorus-oxy-chlorid and the whole heated to and maintained at the boiling-point in a reflux-boiler for from five to seven hours. The resulting clear liquid which has a pale brown color is evaporated *in vacuo* to remove excess of phosphorus-oxy-chlorid. The residue, which has a pasty semi-liquid consistency and is of a light reddish-brown color, is taken up with from three to four times its volume of ether and is shaken together with two and one-half parts of a concentrated aqueous solution of potash (potassium carbonate, forty per cent.) until the evolution of carbonic acid gas has entirely ceased. From this alkaline solution the eugenol-phosphoric acid is liberated by supersaturation with dilute sulphuric acid and then isolated by extracting with ether. After thereupon distilling off the ether the eugenol-phosphoric acid remains in the form of a clear brownish-yellow syrup which on standing in the air solidifies to a compact crystal cake of radiating crystals. The reaction whereby the mono-eugenol-phosphoric acid is formed takes place according to the equations:

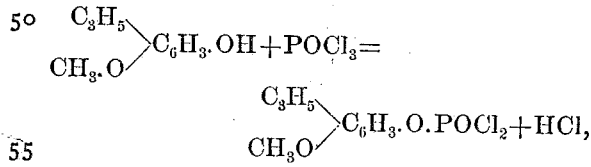

the chlorid of the eugenol-phosphoric acid being subsequently split up into the new acid and hydrochloric acid according to the equation:

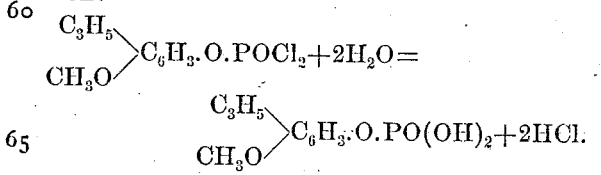

To obtain the eugenol-phosphoric acid perfectly pure, it is redissolved in benzol or dry ether. The acid so obtained consists of fine concentrically-aggregated needles, and in this condition it still contains some water. Its melting-point in this state is from 46° to 50° centigrade. On allowing the same to stand for a longer period in a vacuum over concentrated sulphuric acid it is dehydrated. The dehydrated compound has a melting-point of 105° centigrade and may be obtained in the form of coarse short prismatic crystals by dissolving in dry benzol. These crystals are deliquescent in the air and attract water to such an extent as to gradually melt away. Its formula is,

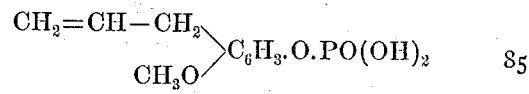

This new acid is readily soluble in water, alcohol, ether, and acetone.

Eugenol-phosphoric acid is a strong dibasic acid which readily decomposes carbonates and forms alkali-salts which are readily soluble in water. Its acid alkali-salts dissolve with difficulty in alcohol, and, like its acid-salts of the aromatic bases, they may be employed as a test to recognize the acid. The acid anilin-salt of this acid, for example, may be obtained in the form of concentrically-grouped needles having a melting-point of 147° from its alcoholic solutions, if these solutions are not too dilute.

2. *Preparation of mono-iso-eugenol-phosphoric-acid.*—To prepare iso-eugenol-phosphoric acid it is not necessary to take the pure well-crystalilzed eugenol-phosphoric acid; but the acid in the syrupy or semiliquid condition above described may be directly heated with from seven to eight times its weight of ten-per-cent. potash-lye to moderate boiling and maintained at this temperature for thirty hours and until a complete molecular transposition to iso-eugenol-phosphoric acid has taken place. The alkaline liquor is then allowed to cool and dilute sulphuric acid is added to liberate the iso-eugenol-phosphoric acid, which is thereupon taken up and isolated by ether, of which about twenty parts are added. The ether solution is then evaporated and the syrupy residue is allowed to stand and cool, when it soon congeals into a crystalline state. The crude acid thus obtained is purified by redissolving in ether or hot benzol.

Iso-eugenol-phosphoric acid, like eugenol-phosphoric acid, crystallizes with one molecule of water. In this condition it melts at from 105° to 106° centigrade. In a dehydrated condition, in which it may be obtained in the manner set forth under eugenol-phosphoric acid, its melting-point is 133° centigrade. Its structural formula is,

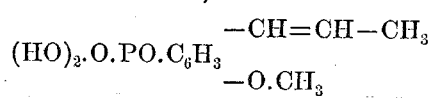

The hydrated acid—i. e., the acid combined with one molecule of water—is permanent in the air. From a concentrated aqueous solution it crystallizes in the form of fine needles aggregated concentrically or in the form of small shining scales. This new acid is readily soluble in water, alcohol, ether, acetone, and hot benzene. It is a strong dibasic acid, readily decomposes carbonates, and forms alkali-salts which are readily soluble in water and alcohol.

The acid alkali-salts are difficultly soluble in alcohol. The acid anilin-salt melts at 188° to 189° centigrade and crystallizes from alcohol in the form of opalescent fine flat prisms.

The latter fact may serve as a sharp test to distinguish iso-eugenol-phosphoric acid from eugenol-phosphoric acid.

3. *Preparation of iso-eugenol.*—If eugenol-phosphoric acid is employed as the starting material in preparing iso-eugenol, one part of the said acid is mixed with two and one-half parts of powdered caustic potash and five parts alcohol (ninety-six per cent.) and boiled for from fifteen to twenty hours in a reflux apparatus. It is then diluted with water, the alcohol is distilled off, and the iso-eugenol is separated from the alkaline solution by means of dilute sulphuric acid. The reaction takes place according to the equations:

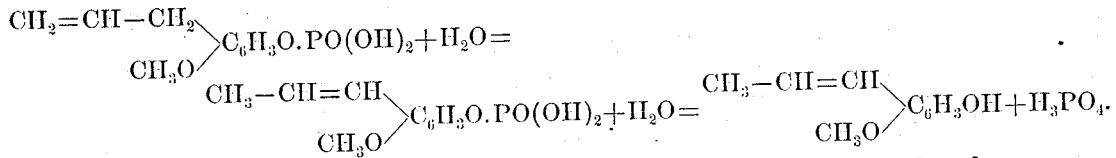

The resultant iso-eugenol may be obtained by distilling the same once. It boils at from 258° to 262° centigrade and yields the characteristic acetyl and benzoyl compounds.

In preparing iso-eugenol from mono-iso-eugenol-phosphoric acid I take the acid sodium or potassium-salts of iso-eugenol-phosphoric acid in a thoroughly-dried state and heat the same to from 160° to 170° centigrade and maintain this temperature for from one to two hours. In the course of this treatment the mass liquefies by reason of the iso-eugenol which is being formed, while the metaphosphate which is concurrently generated is thrown out in the liquor in the form of a jelly. The reaction takes place according to the equations:

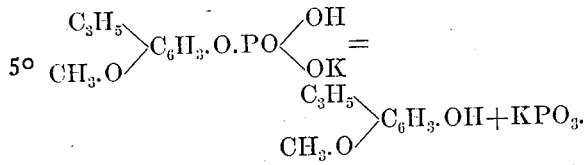

The greatest portion of the iso-eugenol thus formed may be separated from the inorganic salt by decanting or siphoning, while the remainder may be obtained by taking up the metaphosphate in water and etherization. The iso-eugenol so obtained is absolutely pure and possesses the correct boiling-point.

What I claim, and desire to secure by Letters Patent, is—

1. In the art of preparing iso-eugenol, the process which consists in treating eugenol in a neutral condition with phosphorous-oxychlorid.

2. In the art of preparing iso-eugenol, the process which consists in treating eugenol in a neutral condition with phosphorous-oxychlorid, making an alkaline solution of the resultant product and liberating the eugenol-phosphoric acid by acidifying.

3. In the art of preparing iso-eugenol, the process which consists in heating eugenol in a neutral condition with phosphorous-oxychlorid, then evaporating the resultant product *in vacuo* to remove excess of phosphorus-oxy-chlorid, then adding to the residue ether and an alkaline solution and finally supersaturating the alkaline liquor thus formed with an acid solution and isolating the eugenol-phosphoric acid with ether, substantially as set forth.

4. As a new compound, mono-eugenol-phosphoric acid, having the formula hereinabove given, and being a strong dibasic acid, said new compound in its dehydrated state, having the melting-point of substantially 105°, centigrade; forming coarse short prismatic deliquescent crystals by dissolving in dry benzene, and being readily soluble in water, alcohol, ether and acetone.

5. In the art of preparing iso-eugenol, the process which consists in treating mono-eugenol-phosphoric acid with alkali.

6. In the art of preparing iso-eugenol, the process which consists in heating eugenol-phosphoric acid with potash-lye, to moderate boiling, and maintaing at this temperature until complete molecular transposition of the eugenol-phosphoric acid has taken place, then cooling, then adding acid to liberate the iso-eugenol-phosphoric acid formed and then adding ether to isolate the acid, then evapoating the ether solution and allowing the residue to cool.

7. As a new compound, iso-eugenol-phosphoric acid, which has the formula hereinabove given, crystallizes with one molecule of water in which condition its melting-point is about 105°, centigrade, which melts in a dehydrated condition at 133°, centigrade, which is a strong dibasic acid readily decomposing carbonates, and which is readily soluble in water, alcohol, ether, acetone and hot benzene.

8. In the art of preparing iso-eugenol, the process which consists in treating eugenol-phosphoric acid with alkali and alcohol.

9. In the art of preparing iso-eugenol, the process which consists in heating eugenol-phosphoric acid together with alcohol and caustic potash, then distilling off the alcohol and acidifying to separate the resultant iso-eugenol.

10. In the art of preparing iso-eugenol, the process which consists in heating a dried alkali-salt of iso-eugenol-phosphoric acid.

11. In the art of preparing iso-eugenol, the process which consists in heating a thoroughly-dried acid alkali-salt of iso-eugenol-phosphoric acid to the temperature and for the time substantially as set forth.

12. In the art of preparing iso-eugenol, the process which comprises the following steps: heating eugenol with phosphorus-oxy-chlorid, then making an alkaline solution of the resultant product and then liberating the eugenol-phosphoric acid by acidifying the alkaline solution and isolating the same by means of ether, then heating the resultant eugenol-phosphoric acid with an alkali until a complete molecular transposition has taken place.

13. In the art of preparing iso-eugenol, the process which comprises the following steps: heating eugenol with phosphorus-oxy-chlorid, then making an alkaline solution of the resultant product and then liberating the eugenol-phosphoric acid by acidifying the alkaline solution and isolating the same by means of ether, then heating the resultant eugenol-phosphoric acid with an alkali until a complete molecular transposition has taken place, then cooling the alkaline solution, liberating the iso-eugenol-phosphoric acid by acidifying and isolating the same and preparing an acid alkali-salt from the said acid, drying and then heating to the temperature and for the time substantially as set forth, whereby iso-eugenol is formed.

In testimony whereof I affix my signature in presence of two witnesses.

FRITZ ACH.

Witnesses:
ARTHUR GÜHUZ,
JACOB ADRIAN.